United States Patent
Wei et al.

(10) Patent No.: US 12,445,435 B2
(45) Date of Patent: Oct. 14, 2025

(54) TIME-BASED ONE TIME PASSWORD USER INTERFACES

(71) Applicant: Omnissa, LLC, Mountain View, CA (US)

(72) Inventors: YuPing Wei, Beijing (CN); Bruce Lian Xu, Beijing (CN); Dong Zhao, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 63 days.

(21) Appl. No.: 18/503,254

(22) Filed: Nov. 7, 2023

(65) Prior Publication Data
US 2025/0126113 A1  Apr. 17, 2025

(30) Foreign Application Priority Data

Oct. 12, 2023 (WO) ................ PCT/CN2023/124260

(51) Int. Cl.
*H04L 29/06* (2006.01)
*H04L 9/40* (2022.01)

(52) U.S. Cl.
CPC ........ *H04L 63/0838* (2013.01); *H04L 63/067* (2013.01); *H04L 63/0815* (2013.01)

(58) Field of Classification Search
CPC ............... H04L 63/0838; H04L 63/067; H04L 63/0815
See application file for complete search history.

(56) References Cited

U.S. PATENT DOCUMENTS

| 9,979,719 | B2 * | 5/2018 | Oberheide | .......... H04L 63/0838 |
| 2015/0370472 | A1 * | 12/2015 | Privault | ................. G06F 3/017 |
| | | | | 715/810 |
| 2019/0212828 | A1 * | 7/2019 | Kin | ..................... G06F 3/04815 |
| 2020/0106615 | A1 * | 4/2020 | Rule | ................... H04L 63/0442 |
| 2022/0392453 | A1 * | 12/2022 | Gupta | ....................... G10L 17/12 |
| 2023/0029152 | A1 * | 1/2023 | Zaloum | ................. G06F 21/316 |
| 2025/0112913 | A1 * | 4/2025 | Ansari | ..................... H04L 63/18 |

FOREIGN PATENT DOCUMENTS

WO    WO-2019075447 A1 *  4/2019  ............. G06F 21/45

OTHER PUBLICATIONS

Mahdi, Bashar Saadoon, Mustafa Jasim Hadi, and Ayad Rodhan Abbas. "Intelligent security model for password generation and estimation using hand gesture features." Big Data and Cognitive Computing 6.4 (2022): 116. (Year: 2022).*

* cited by examiner

*Primary Examiner* — Shawnchoy Rahman
(74) *Attorney, Agent, or Firm* — Kim & Stewart LLP

(57) ABSTRACT

Disclosed are various embodiments for facilitating user interaction with one time password user interfaces within an authentication application. A QR code can be detected in a UI obtained from an authentication service, and TOTPs generated so that they can be inserted into a context menu generated within the UI of the authentication application.

20 Claims, 4 Drawing Sheets

TIME-BASED ONE TIME PASSWORD USER INTERFACES

CROSS-REFERENCE TO RELATED APPLICATION

This application claims priority to application No. PCT/CN2023/124260, filed Oct. 12, 2023, entitled "TIME-BASED ONE TIME PASSWORD USER INTERFACES", each of the contents of which is incorporated herein by reference in their entirety for all purposes.

BACKGROUND

Authenticator applications can generate one time passwords (OTPs) that can be used in multi-factor authentication (MFA) or two-factor authentication (2FA). To generate OTPs, authenticator applications must generate or otherwise receive a private key, often called a seed, that is shared between a user device and the authorizing application. The seed can then be used by a specified algorithm to generate an OTP. Authenticator applications often generate these OTPs as time-based OTPs (TOTPs), where both the time on a user device and the seed are used by a specified algorithm to generate a TOTP. In many implementations of a OTP protocol, a user is asked to scan a barcode or enter a secret key followed by providing one or more OTPs in a user interface so that the authenticating service can perform an initial verification of the OTPs.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for time-based one time password setup in an authentication application that facilitates entry of initial one time passwords (OTPs) using user interface elements. Authenticator applications can generate one time passwords (OTPs) that can be used in multi-factor authentication (MFA) or two-factor authentication (2FA). To generate OTPs, authenticator applications must generate or otherwise receive a private key, often called a seed, that is shared between a user device and the authorizing application. The seed can then be used by a specified algorithm to generate an OTP. Authenticator applications often generate these OTPs as time-based OTPs (TOTPs), where both the time on a user device and the seed are used by a specified algorithm to generate a TOTP.

Seeds are often provided via a barcode, such as a quick response (QR) code that is displayed in a user interface. In some examples, a user is expected to display the QR code in a first device and utilize a second device to scan the QR code to obtain the seed for the TOTP protocol. The user then expected to provide one or more initial OTPs that are generated using a specified algorithm from the seed. The OTPs are provided to the authenticating service to verify that the seed was received that that the client device is generating the correct OTP's based upon the seed.

In examples of this disclosure, functionality can be provided in an authenticator application on a client device that can automatically detect the presence of a QR code or other barcode containing a TOTP seed and automatically generate one or more initial TOTP codes that can be placed into a context menu associated with a user input field. The user input field can comprise a field in which the initial TOTP code or codes can be provided to the authenticating service for verification.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
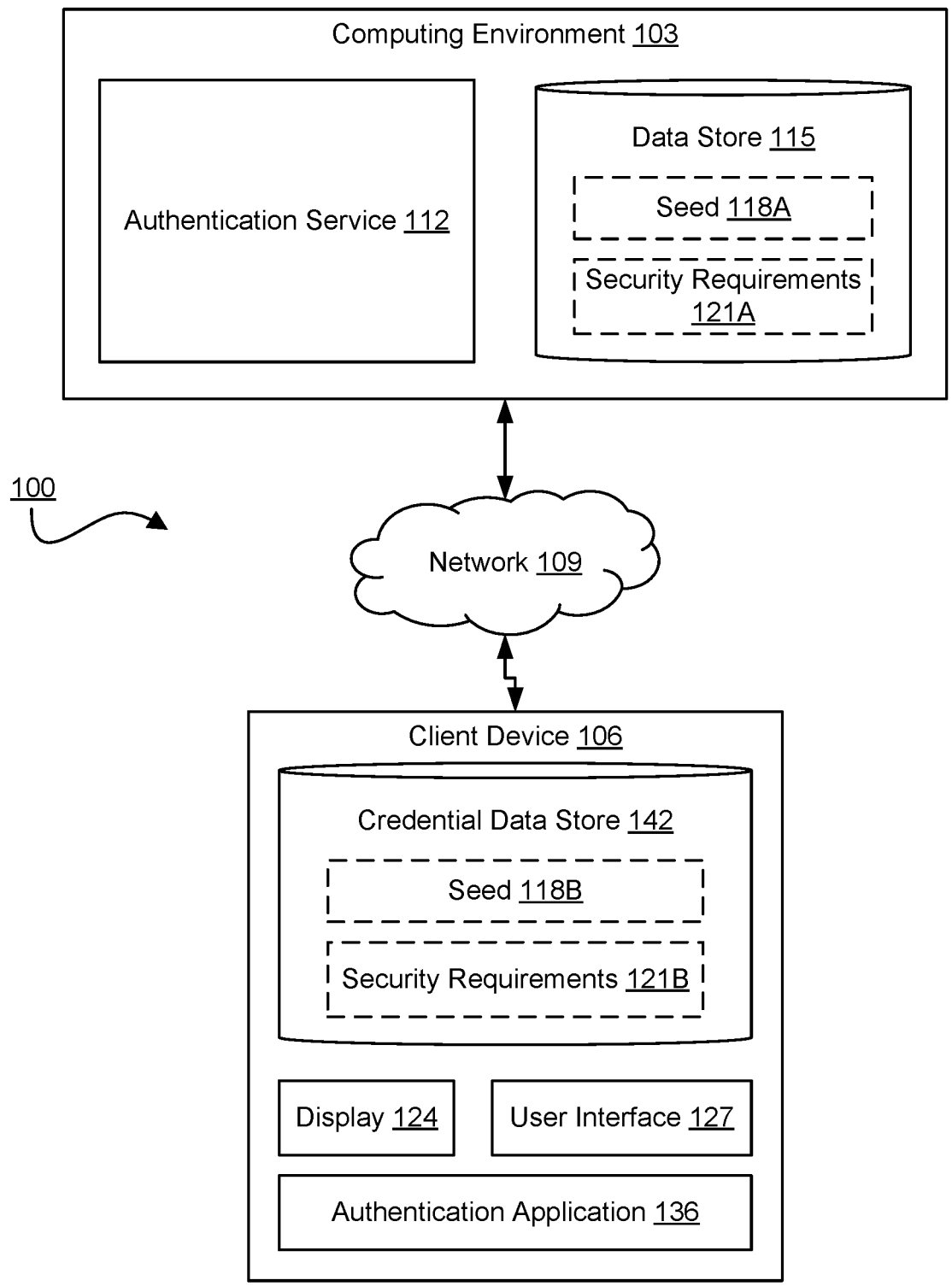
FIG. 1 is a drawing of a network environment according to various embodiments of the present disclosure.

With reference to FIG. 1, shown is a network environment 100 according to various embodiments. The network environment 100 can include a computing environment 103 and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 can include an authentication service 112 and other applications, services, processes, systems, engines, or functionality not discussed in detail herein.

The authentication service 112 can be a portion of a larger application that requires user authentication to access specified, private or otherwise confidential documents, files, or materials on the computing environment 103. The authentication service 112 can generate requests for a client device 106 to generate a seed 118. In at least one embodiment, such requests may include an encrypted copy of a seed 118A. In at least another embodiment, the request for the client to generate a seed 118 can include instructions to generate a seed 118 based on pre-shared information. The authentication service 112 can also send security requirements 121 to a client device 106.

The authentication service 112 can also receive requests to authenticate the identity of a user of a client device 106. The requests to authenticate can include an OTP or a TOTP, as well as other identifying information (e.g., username, password, etc.). The authentication service 112 can determine which seed 118A stored in the data store 115 corresponds to a specified client device 106 and generate an OTP or TOTP to validate such a request to authenticate. If the generated OTP or TOTP matches the received OTP or TOTP from the request to authenticate, then the authentication service 112 can send a token to the client device 106 to authorize access to other applications or services controlled by the computing environment 103.

The authentication service 112 can also be executed to receive notifications from one or more client devices 106 that indicate that the client device 106 has been compromised. In such a situation, the authentication service 112 can then deauthorize the seed 118A or otherwise prevent authorizing any OTPs or TOTPs until a secure posture on the client device 106 has been re-established.

Also, various data is stored in a data store 115 that is accessible to the computing environment 103. The data store 115 can be representative of a plurality of data stores 115, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 115 is associated with the operation of the various applications or functional entities described below. This data can include seeds 118A and security requirements 121B, and potentially other data.

The seeds 118 can represent one or more cryptographic keys that can be used generate an OTP. The seeds 118A can be stored on the data store 115 and the seeds 118B can be stored in the credential data store 142. The one or more cryptographic keys can be asymmetric cryptographic keys. In many embodiments, the cryptographic keys can be a random or pseudo-random set of characters that can be used by one or more algorithms to generate OTPs. For example, the cryptographic keys can be used by a version of a time-based one-time password algorithm or a HMAC-based one-time password algorithm. To generate an OTP on the client device 106, the client device 106 should include one or more seeds 118B. To permit access to any service that requires MFA, the computing environment 103 can access a seed 118A that corresponds or otherwise matches the seed 118B from the client device 106 so that both the client device 106 and the computing environment 103 can generate a corresponding or matching OTP.

The security requirements 121 can represent one or more rules or instructions for a client device 106 and the authentication service 112 can utilize to generate a TOTP from a seed 118. The security requirements 121 can specify which OTP algorithm should be utilized, an initial time from which the client device 106 and authentication service 112 should begin counting steps, and an interval value from the initial time or a previous time that can be utilized, in combination with the seed 118, to generate a given OTP. The security requirements 121 can also identify a hash function that should be utilized by the client device 106 and the authentication service 112 to generate a given OTP.

The security requirements 121 can also include one or more rules that ensure the client device 106 is secured. For instance, security requirements 121 can include the requirement that a client device 106 have the operating system's firewall turned on; a client device 106 without a firewall may likely not be secure. In at least another example, security requirements 121 can include that the client device 106 not be jailbroken or rooted; given that a jailbroken or rooted client device 106 may not be secure. Additional security requirements 121 may include a determination of whether the client device 106 is file system encryption enabled, whether the client device 106 is password enabled, whether the client device 106 is screen lock enabled, whether the client device 106 is USB-debugging enabled, and/or whether the client device 106 is development mode enabled. In at least another example, the security requirements 121 can include an operating system version number that, when compared to the version number of the operating system on the client device 106, can determine whether the device is secure. The rules of the security requirements 121 can be evaluated by an application on the client device 106.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 124, such as liquid crystal displays (LCDs), gas plasma-based flat panel displays, organic light emitting diode (OLED) displays, electrophoretic ink (E-ink) displays, projectors, or other types of display devices. In some instances, the display 124 can be a component of the client device 106 or can be connected to the client device 106 through a wired or wireless connection.

The client device 106 can be configured to execute various applications such as an authentication application 136 and/or other applications. Authentication application 136 can be executed in a client device 106 to access network content served up by the computing environment 103 or other servers, thereby rendering a user interface 127 on the display 124. To this end, authentication application 136 can include a browser, a dedicated application, or other executable, and the user interface 127 can include a network page, an application screen, or other user mechanism for obtaining user input. The client device 106 can be configured to execute applications beyond authentication application 136, such as email applications, social networking applications, word processors, spreadsheets, or other applications.

Authentication application 136 can represent a single sign-on client application that can be utilized to authenticate a user as well as access an app catalog provided by the enterprise to access enterprise applications. Authentication application 136 can facilitate the setup of OTPs with SaaS applications or other services that can be accessed through authentication application 136. Accordingly, the functionality of examples of the disclosure can be incorporated into authentication application 136 in one embodiment.

The client device 106 can comprise a credential data store 142 that can store a seed 118 and security requirements 121 corresponding to one or more TOTP accounts that are managed by authentication application 136. The credential data store 142 can comprise a database managed by the operating system or a database that is private to authentication application 136.

Authentication application 136 can allow a user to enroll into MFA or 2FA by generating or obtaining a seed 118B from a uniform resource identifier or uniform resource locator that is embedded in a barcode such as a QR code provided by the authentication service 112. Authentication application 136, in examples of this disclosure, can automatically extract a URI or other data from a QR code provided by the authentication service 112 or a third party service, extract a seed 118 from the URI, generate an OTP according to a OTP protocol specified by the URI, and provide an initial TOTP (or multiple initial TOTPs) into a context menu that the user can select from to enter into an input field for verification.

In one example, a user can request authentication application 136 to access a particular service, such as a SaaS service. In one implementation, authentication application 136 can utilize a web view capability of the client device 106 operating system to render web pages within an application. The web view capability can allow authentication application 136 to render a web-based UI within the 136 by accessing web pages provided by an authentication service 112. Authentication application 136 can access a login page of an authentication service 112 and render a login portal in which the user can setup a TOTP authentication with the authentication service 112.

Additional details of at least some the actions of authentication application 136 are described in the following discussion of FIGS. 2-4.

Figure 2:
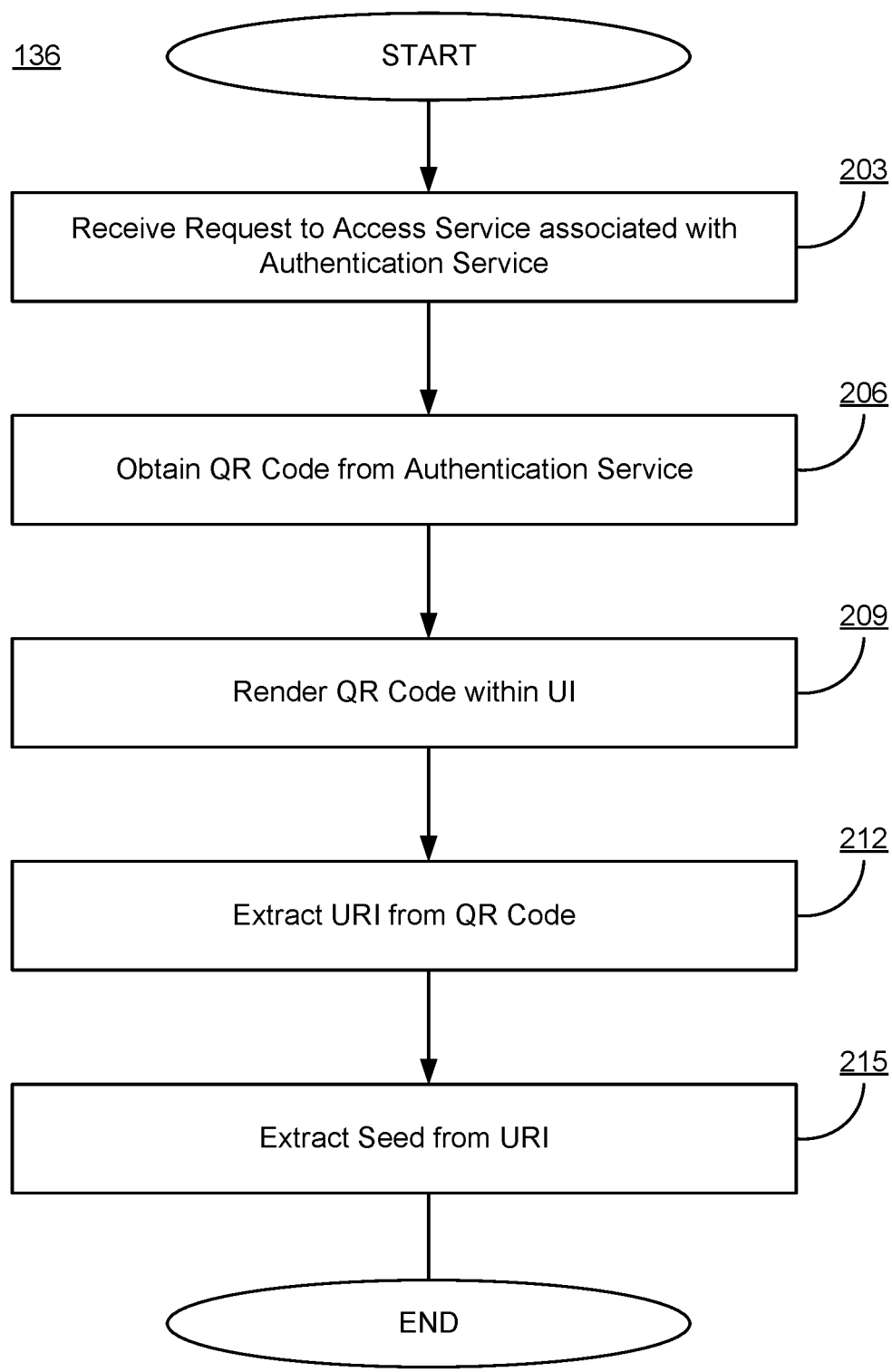
FIG. 2 is a flowchart illustrating one example of functionality implemented as portions of an application executed in a client device in the network environment of FIG. 1 according to various embodiments of the present disclosure.

As further described in FIG. 2, authentication application 136 can be executed to receive a request to generate a seed 118B which enrolls a user into MFA or 2FA. Authentication application 136 can be executed to receive device security requirements 121 from the computing environment 103 that detail the posture that the client device 106 needs to be in to generate a seed 118 and generate an OTPs or TOTPs. The security requirements 121 can also comprise information about a shared counter that the authentication service 112 and the authentication application 136 can utilize to generate a OTP.

At step 203, authentication application 136 can receive a request to access a service via authentication application 136. The requested service can represent a SaaS or enterprise service for which access requires MFA that is authenticated by an authentication service 112. The authentication application 136, in one example, can determine whether there is an access token stored within the credential data store 142 that can be utilized to access the requested service. In some cases, such an access token can be utilized to authenticate the user without requiring an additional authentication, such as in the case of the user being previously authenticated by the authentication application 136 with the authentication service 112. In another case, the access token might be expired, requiring the user to provide a password, or a OTP, in which case, the authentication application 136 can render a UI within a web view component, for example, that allows the user to enter the password and/or OTP.

Assuming the user has not previously setup MFA within the requested service, the authentication application 136 can obtain a QR code from the authentication service 112 that incorporates a URI specifying information about setting up MFA. In some cases, it should be appreciated that prior to setting up MFA, the authentication service 112 can also require that the user perform an initial authentication by providing a username, password, and/or an alternative one-time password, such as a code provided to the user via email or SMS.

At step 206, the authentication application 136 can obtain a QR code or other representation of a URI in which an OTP shared secret and other metadata about the OTP protocol can be embedded. The authentication application 136 can obtain a page from the authentication service 112 in which the QR is embedded. The authentication application 136 can utilize a web view component of the operating system or a browser SDK library that allows the authentication application 136 to render one or more pages or components obtained from the authentication service 112 including the QR code.

In one implementation, the authentication application 136 can determine whether there is an HTML canvas element in a page obtained from the 112. In many SaaS platforms, a TOTP secret is generated by the authentication service 112 and inserted into a QR code rendered in an HTML canvas element in the web page. The QR code image can be obtained by injecting JavaScript code into the page to extract the image data from the page rendered by the authentication application 136.

The authentication application 136 can also register a callback action on a gesture, such as a long press, which is associated with user selection of a user interface element. The callback action in an Android environment can override a startActionMode method. In an iOS environment, the callback action can override the UILongPressGestureRecognizer method. The authentication application 136 can override the callback action to inject items into a context menu that the authentication application 136 can render when the gesture is detected. The authentication application 136 can insert one or more OTPs that are calculated from the information embedded in the QR code. As noted above, an initial OTP can be required by the authentication service 112 to verify the setup of MFA. The authentication service 112 can often present user input fields in the same page in which the QR code is embedded. Accordingly, when a gesture such as long press is detected, the authentication application 136 can calculate one or more OTPs from the seed and initial counter data embedded in the QR code and inject the OTPs into a context menu that can be rendered when the gesture is performed by the user.

If the user selects one of the OTPs that are injected into the context menu, the authentication application 136 can insert or paste the selected OTP into the user input field on which the user performed the gesture.

At step 209, the authentication application 136 can render the QR code obtained from the authentication service 112 within a user interface of the authentication application 136. The QR code can be rendered within a user interface of the authentication application 136 by a web view component. The user interface can be obtained from the authentication service 112 and can also include one or more user input fields in which the user can provide an OTP generated from the seed and counter data embedded into the QR code. The user input fields can also be rendered in the UI of the authentication application 136.

At step 212, the authentication application 136 can extract the URI containing OTP data from the QR code. The URI can specify a seed 118 as well as security requirements 121, such as counter data or a counter interval from which the authentication application 136 can calculate a particular OTP.

At step 215, the authentication application 136 can extra the seed 118 from the URI. The seed 118 can be stored in the credential data store 142 along with the security requirements 121 data associated with the particular service that the user is attempting to access. Thereafter, the process can proceed to completion.

Figure 3:
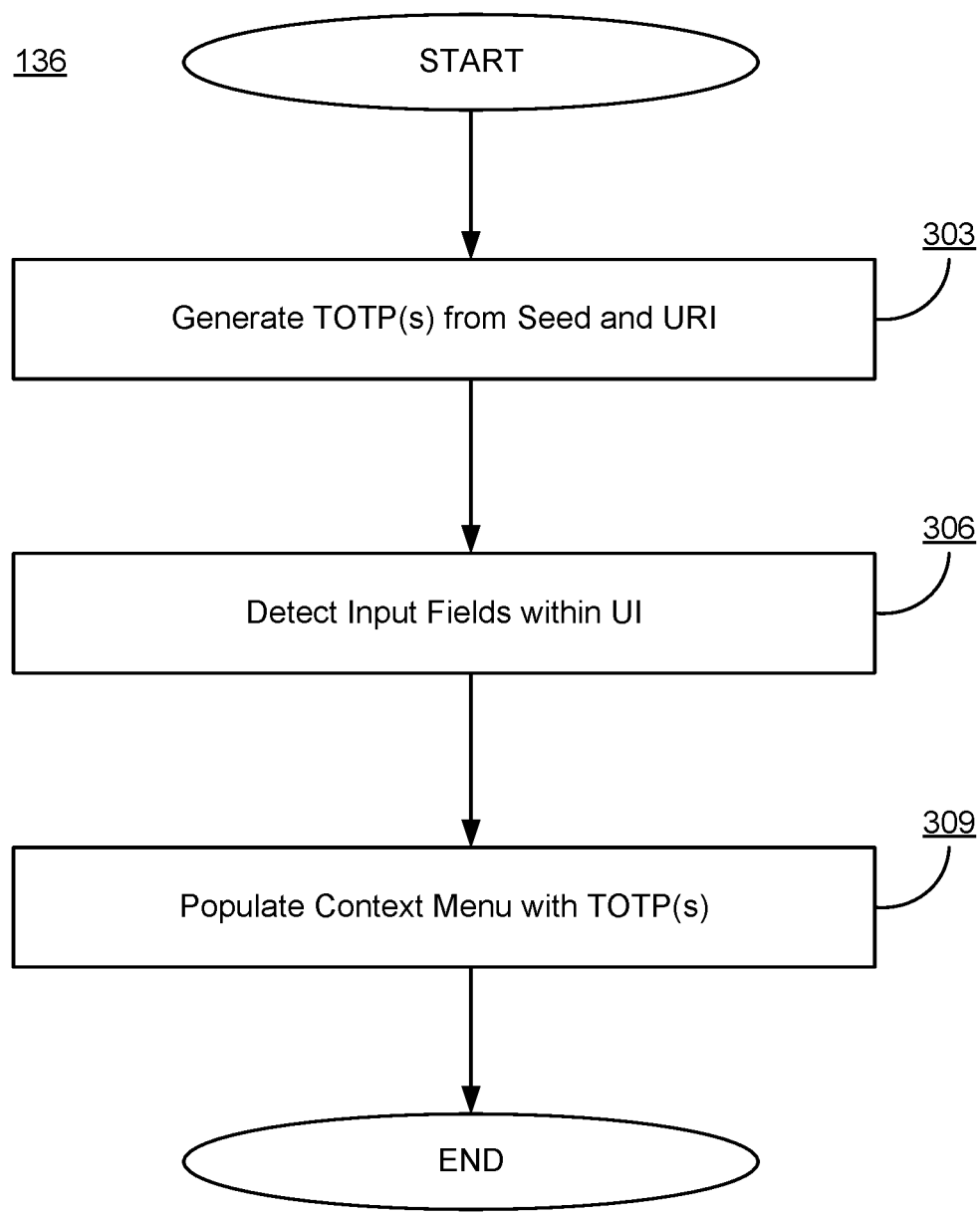
FIG. 3 is a flowchart illustrating another example of functionality implemented as portions of an application executed in a client device in the network environment of FIG. 1 according to various embodiments of the present disclosure.

The flowchart of FIG. 3 illustrates how the authentication application 136 can populate a context menu associated with a user input field in a user interface. At step 303, the authentication application 136 can generate a TOTP from a seed 118 and counter information extracted from the URI identified in the process of FIG. 2. The authentication application 136 can generate the TOTP according to an algorithm specified by the security requirements 121 extracted from the URI or separately obtained from the authentication service 112.

At step 306, the authentication application 136 can detect one or more user input fields within the user interface. The authentication service 112 might require one or more TOTPs to be inputted into the fields that the authentication service 112 can verify before establishing MFA on behalf of a particular user.

At step 309, the authentication application 136 can populate a context menu associated with the user input fields with the TOTPs generated at step 303. As noted above, the authentication application 136 can register a callback action on a gesture, such as a long press, which is associated with user selection of a user interface element. The callback action in an Android environment can override a startActionMode method. In an iOS environment, the callback action can override the UILongPressGestureRecognizer method. The authentication application 136 can override the callback action to inject items into a context menu that the authentication application 136 can render when the gesture is detected. The authentication application 136 can insert one or more OTPs that are calculated from the information embedded in the QR code. As noted above, an initial OTP can be required by the authentication service 112 to verify the setup of MFA. The authentication service 112 can often present user input fields in the same page in which the QR code is embedded. Accordingly, when a gesture such as long press is detected, the authentication application 136 can calculate one or more OTPs from the seed and initial counter data embedded in the QR code and inject the OTPs into a context menu that can be rendered when the gesture is performed by the user.

The authentication application 136 can intercept the callback action for those user input fields that match a particular keyword in at least one of an id, a name, or a placeholder attribute of an element of the user input field. In one example, the specified keyword can include at least one of "passcode," "security," or "code."

Figure 4:
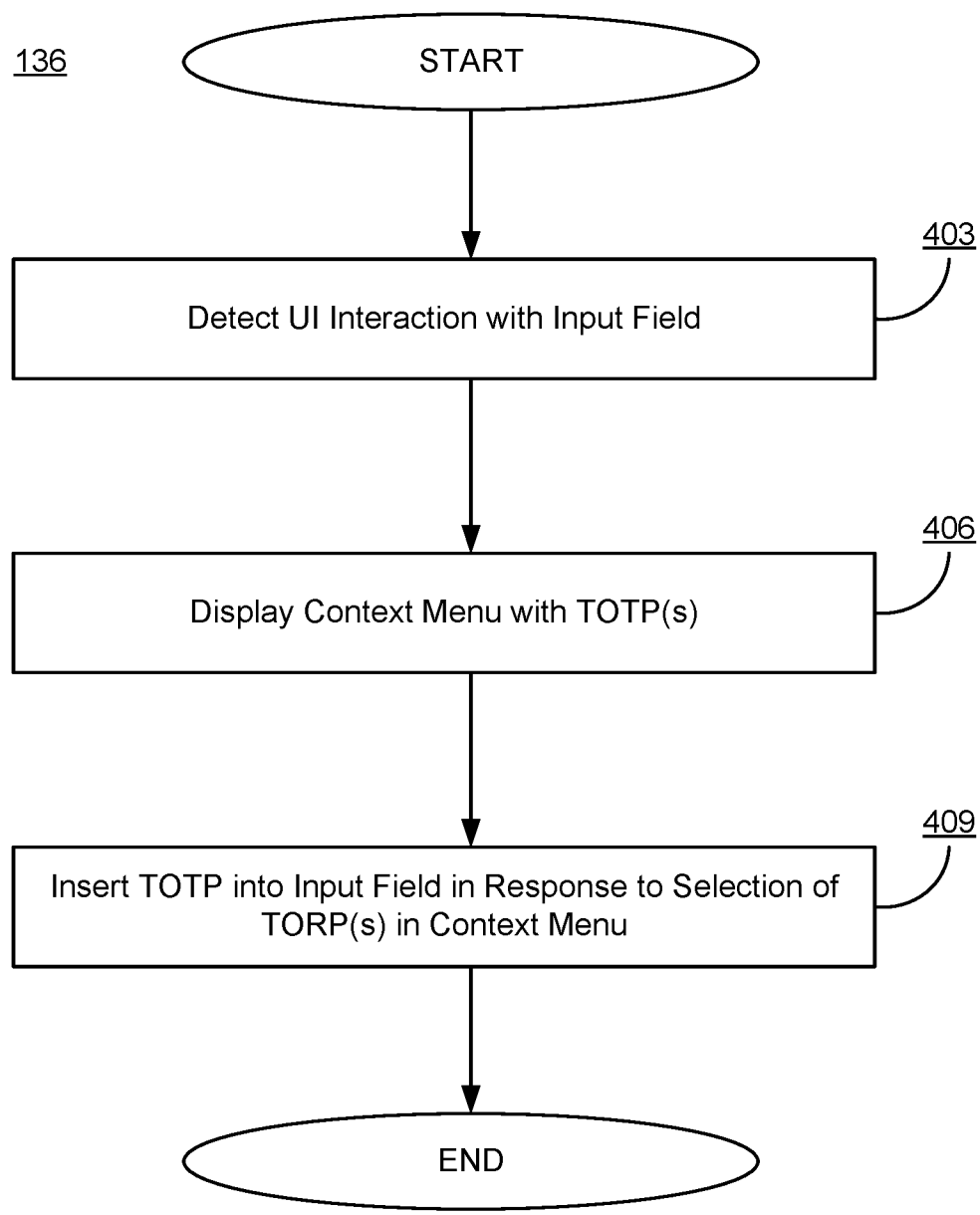
FIG. 4 is a flowchart illustrating another example of functionality implemented as portions of an application executed in a computing environment in the network environment of FIG. 1 according to various embodiments of the present disclosure.

The flowchart of FIG. 4 illustrates how the authentication application 136 can allow a user to populate a user input field(s) with one or more OTPs. At step 403, the authentication application 136 can detect a user interaction with a user input field. The user interaction can be a long press gesture on the user input field. As noted above, the authentication application 136 can detect an input field based upon a keyword matching in at least one of an id, a name, or a placeholder attribute of an element of the user input field.

Upon detecting the intercepted callback gesture, the authentication application 136 can display a context menu containing the one or more TOTPs generated by the authentication application 136 at step 406. At step 409, upon detecting selection or one or more of the TOTPs, the authentication application 136 can insert the TOTPs selected from the context menu into the user input field. The authentication application 136 can inject JavaScript code into the page to paste the TOTP into the user input field.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a client device comprising a processor and a memory; and
instructions stored in the memory that, when executed by the processor, cause the client device to at least:
detect a specified user gesture corresponding to triggering a contextual menu in a user interface;
detect a one-time password uniform resource identifier (URI) in the user interface;
determine that the specified user gesture is associated with a user input field for entering a one-time password corresponding to a one-time password protocol associated with the one-time password URI;
generate the one-time password; and
insert the one-time password into a context menu associated with the user input field.

2. The system of claim 1, wherein the instructions determine that the specified user gesture is associated with the user input field for entering the one-time password by detecting a specified keyword in at least one of an id, a name, or a placeholder attribute of an element of the user input field.

3. The system of claim 1, wherein the specified keyword comprises at least one of passcode, security, or code.

4. The system of claim 1, wherein the user input field is generated by a web view component of a single sign-on application executed by the client device.

5. The system of claim 1, wherein the instructions generate a one-time password account in a credential data store on the client device corresponding to the one-time password URI.

6. The system of claim 5, wherein the instructions save a shared secret corresponding to the one-time password URI and a shared counter corresponding to the one-time password URI into the credential data store.

7. The system of claim 1, wherein the instructions generate the one-time password based upon a shared secret and a shared counter corresponding to the one-time password URI.

8. A method, comprising:
   detect a specified user gesture corresponding to triggering a contextual menu in a user interface;
   detect a one-time password uniform resource identifier (URI) in the user interface;
   determine that the specified user gesture is associated with a user input field for entering a one-time password corresponding to a one-time password protocol associated with the one-time password URI;
   generate the one-time password; and
   insert the one-time password into a context menu associated with the user input field.

9. The method of claim 8, wherein determining that the specified user gesture is associated with the user input field for entering the one-time password further comprises detecting a specified keyword in at least one of an id, a name, or a placeholder attribute of an element of the user input field.

10. The method of claim 8, wherein the specified keyword comprises at least one of passcode, security, or code.

11. The method of claim 8, wherein the user input field is generated by a web view component of a single sign-on application executed by the client device.

12. The method of claim 8, further comprising generating a one-time password account in a credential data store on the client device corresponding to the one-time password URI.

13. The method of claim 12, further comprising saving a shared secret corresponding to the one-time password URI and a shared counter corresponding to the one-time password URI into the credential data store.

14. The method of claim 8, further comprising generating the one-time password based upon a shared secret and a shared counter corresponding to the one-time password URI.

15. A non-transitory, computer-readable medium, comprising machine-readable instructions that, when executed by a processor of a computing device, cause the computing device to at least:
   detect a specified user gesture corresponding to triggering a contextual menu in a user interface;
   detect a one-time password uniform resource identifier (URI) in the user interface;
   determine that the specified user gesture is associated with a user input field for entering a one-time password corresponding to a one-time password protocol associated with the one-time password URI;
   generate the one-time password; and
   insert the one-time password into a context menu associated with the user input field.

16. The non-transitory, computer-readable medium of claim 15, wherein the instructions determine that the specified user gesture is associated with the user input field for entering the one-time password by detecting a specified keyword in at least one of an id, a name, or a placeholder attribute of an element of the user input field.

17. The non-transitory, computer-readable medium of claim 15, wherein the user input field is generated by a web view component of a single sign-on application executed by the client device.

18. The non-transitory, computer-readable medium of claim 15, wherein the user input field is generated by a web view component of a single sign-on application executed by the client device.

19. The non-transitory, computer-readable medium of claim 15, wherein the instructions generate a one-time password account in a credential data store on the client device corresponding to the one-time password URI.

20. The non-transitory, computer-readable medium of claim 19, wherein the instructions save a shared secret corresponding to the one-time password URI and a shared counter corresponding to the one-time password URI into the credential data store.

* * * * *